W. H. STONE.
Fruit-Gatherer.
No. 57,008.
Patented Aug. 7, 1866.
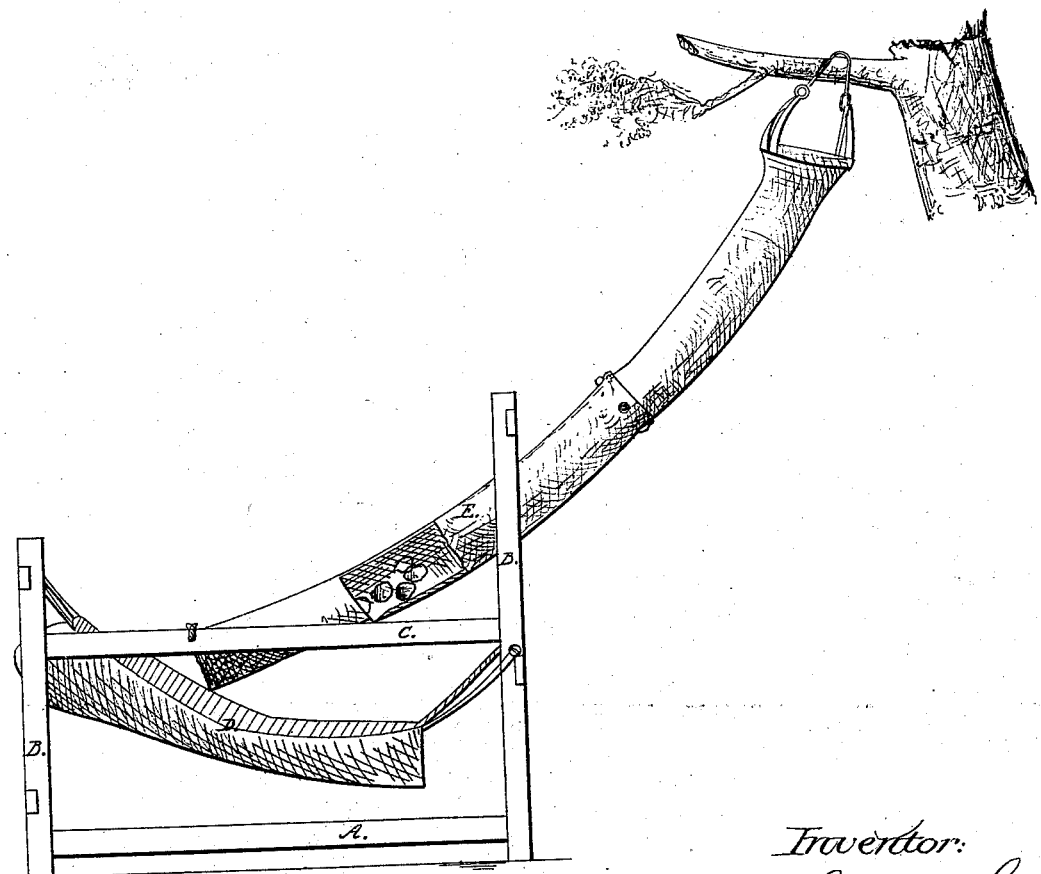

UNITED STATES PATENT OFFICE.

WARREN H. STONE, OF ST. JOHN'S, MICHIGAN.

IMPROVEMENT IN DEVICES FOR GATHERING FRUIT.

Specification forming part of Letters Patent No. 57,008, dated August 7, 1866.

*To all whom it may concern:*

Be it known that I, WARREN H. STONE, of St. John's, Clinton county, and State of Michigan, have invented a new and Improved Device for Gathering Fruit; and I do hereby declare that the following is a full, clear, and exact description thereof, which will enable others skilled in the art to make and use the same, reference being had to the accompanying drawing, forming part of this specification.

The nature of my invention consists in so combining a flexible tube which is made in sections and a flexible apron with a frame that fruit may be gathered from the highest trees and conducted through the flexible tube and deposited without injury upon the flexible apron, from which it gently rolls and is deposited in the basket or on ground.

It has for a long time been the great desideratum of inventors and fruit-growers to devise some means by which fruit might be gathered rapidly and without injury. To this end various kinds of ladders and elevated platforms have been devised without obtaining the object so much desired; but by my invention the difficulties heretofore encountered are overcome and the labor made easy for gathering fruit, which is done rapidly and without injury to the fruit.

The figure represents a side elevation, showing a portion of the apron in perspective and a portion of the tube broken out.

To enable others skilled in the art to make and use my invention, I proceed to describe its construction and operation.

Letters of like name and kind refer to like parts in the figure.

A is a rectangular frame, made of wood, with the posts B extending above the side or rails C.

D is an apron, made of textile or other suitable material, with each corner suspended, by proper cords or otherwise, to each corner of the frame, with one end a little the lowest, as seen in the figure.

E is a flexible tube, made of suitable fabric or other material, of a suitable or proper size, so as to allow the fruit, as it is gathered, to pass down upon the apron D. This tube is made in sections of any desired length, and any number of them may be joined or attached together by means of buttons or other well-known means. At the upper section of this tube are second elastic straps or cords, by which the upper end of the tube may be readily attached to the limbs or branches in any desired position or location in the tree. The lower section of the tube is secured to the rails or side pieces of the frame, and the middle sections supported by the top cross-piece of the frame.

It will be seen that a portion of the tube is broken out, so as to show the movement of the fruit in its descent to the apron.

The operation consists simply in placing the frame in a proper position near the tree, and properly securing the lower end of the tube to the frame, and extending the upper section to a convenient locality in the tree and securing it to some of the branches.

The operator or person at work may have the use of both hands to gather the fruit and put it into the mouth of the tube, when it descends and is deposited upon the apron below, from which it can be removed at will.

By this means fruit may be gathered without injury and in the most rapid manner.

Having thus described my invention, what I claim as new, and desire to secure by Letters Patent, is—

The combination of the flexible tube E, apron D, with the frame A, or its equivalent, all for the purposes, and substantially as herein described.

WARREN H. STONE.

Witnesses:
PORTER K. PERRIN,
A. J. BALDWIN.